United States Patent [19]

Murray

[11] 4,430,952
[45] Feb. 14, 1984

[54] PLANTER GAUGE WHEELS WITH ADJUSTABLE EQUALIZER MECHANISM

[75] Inventor: David L. Murray, La Porte, Ind.

[73] Assignee: Allis-Chalmers Corporation, Milwaukee, Wis.

[21] Appl. No.: 415,150

[22] Filed: Sep. 7, 1982

[51] Int. Cl.³ .............................................. A01C 5/06
[52] U.S. Cl. ........................................ 111/85; 111/88
[58] Field of Search ................... 111/85, 52, 87, 88; 172/239

[56] References Cited

U.S. PATENT DOCUMENTS 4,356,780 11/1982 Bauman ................................. 111/85

FOREIGN PATENT DOCUMENTS 179314 5/1962 Sweden ................................. 111/52

Primary Examiner—Robert A. Hafer
Assistant Examiner—Danton DeMille
Attorney, Agent, or Firm—Charles L. Schwab

[57] ABSTRACT

A row crop planter unit (11) is supported by a pair of laterally spaced wheel and disc assemblies (56, 57) mounted on corresponding ends of a pair of walking beams (58, 59). The other corresponding ends of the walking beams (58, 59) are interconnected by an equalizer mechanism (76) which includes a cable (91) and vertically adjustable pulley (77).

3 Claims, 3 Drawing Figures

PLANTER GAUGE WHEELS WITH ADJUSTABLE EQUALIZER MECHANISM

BACKGROUND OF THE INVENTION

1. Technical Field

This invention relates to a wheeled support for an agricultural implement and, more particularly, to a mounting for a pair of support or gauge wheels of a planter unit which includes an equalizer mechanism.

2. Prior Art

Heretofore, others have provided a pair of gauge wheels for a planter unit which are mounted on individual levers or beams pivotally connected to the planter unit frame. In such prior art arrangements, the equalizing levers are permitted to oscillate relative to one another through an adjustable walking beam lever mechanism interconnecting the free ends of the two gauge wheel mounting beams. The prior art structures require a number of pivots and proper fitting of mechanical parts in order for the equalizer mechanism to be properly manufactured and installed in the planter unit. The present invention provides a relatively uncomplicated equalizer mechanism for the gauge wheels which is accessible for servicing and easy to adjust for changing the depth of planting.

SUMMARY OF THE INVENTION

The invention is advantageously used in an agricultural implement having a frame supported by wheels. A pair of laterally spaced support wheels are mounted on the frame by means in the form of a pair of side-by-side, longitudinally extending walking beams having intermediate portions pivotally connected to the frame. Appropriate means are provided to rotatably support the wheels on corresponding ends of the walking beams. An equalizer mechanism interconnects the other corresponding ends of the walking beams which included a pulley adjustably mounted on the frame and a flexible tension member reeved over the pulley and having its opposite ends connected to the other corresponding ends of the walking beams. The depth of soil working by the implement is adjusted by adjusting the position of the pulley relative to the frame.

BRIEF DESCRIPTION OF THE DRAWINGS

One embodiment of the invention is illustrated in the drawings in which.

DETAILED DESCRIPTION OF THE DRAWINGS

Figure 1:
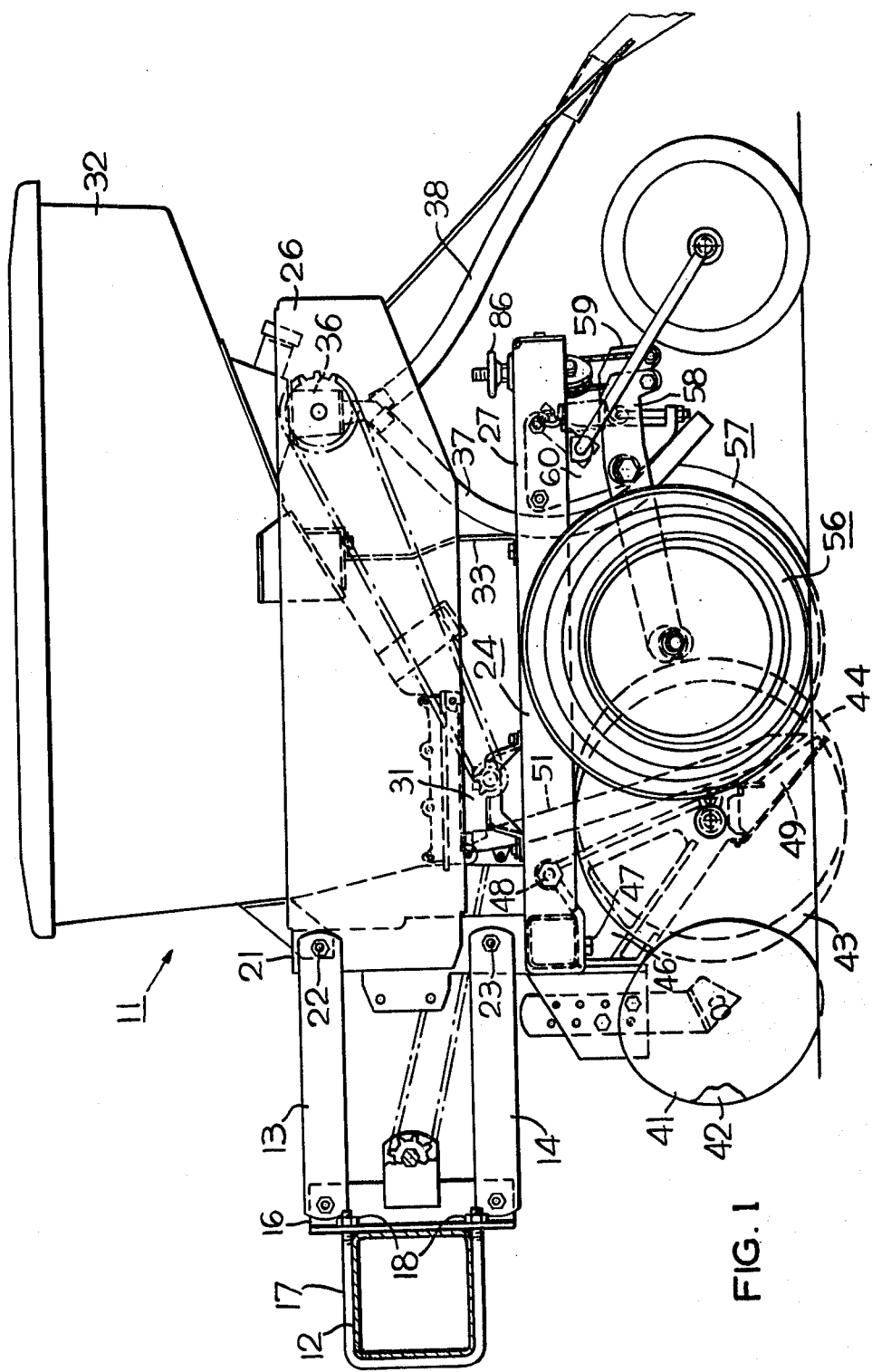
FIG. 1 is a side view of a row crop planter unit.

Referring to FIG. 1, an agricultural implement in the form of a planter unit 11 is secured to a draft appliance in the form of a transverse tool bar 12 by a pair of parallel links 13, 14 pivotally connected at their forward ends to an upright angle member 16 secured to the tool bar 12 by a U-bolt 17 and nuts 18. The rear of the parallel links 13, 14 are pivotally connected to an upright mast member 21 by a pair of transverse pivot bolts 22, 23. The mast member 21 is part of a frame 24 of the planter unit 11. An upper subframe 26 is secured to the upright mast member 21 and a lower subframe 27 is secured to the lower end of the upright mast member 21. The lower subframe 27 supports a seed singulating mechanism 31 connected to the lower end of a hopper 32. The hopper is pivotally connected at its forward end by the pivot bolt 22 and is mounted on a vertical support 33 near its bottom midpoint. A dual metering mechanism 36 is provided at the rear of the hopper to meter insecticide and herbicide from separate rear compartments of the hopper to discharge tubes 37, 38.

Trash clearing discs 41, 42 are mounted at the front of the planter frame 24 and a soil penetrating tool in the form of a pair of disc openers 43, 44 are rotatably mounted on a bracket 46 secured to the subframe 27 by a cap screw 47 and a transverse bolt 48. A scrapper 49 is provided to clean the laterally inner sides of the discs 43, 44 the opening 82 being disposed above the pulley 77. A seed drop tube 51 is provided to drop the seeds from the singulating mechanism 31 in the trench opened by the discs 43, 44.

Figures 2, 3:
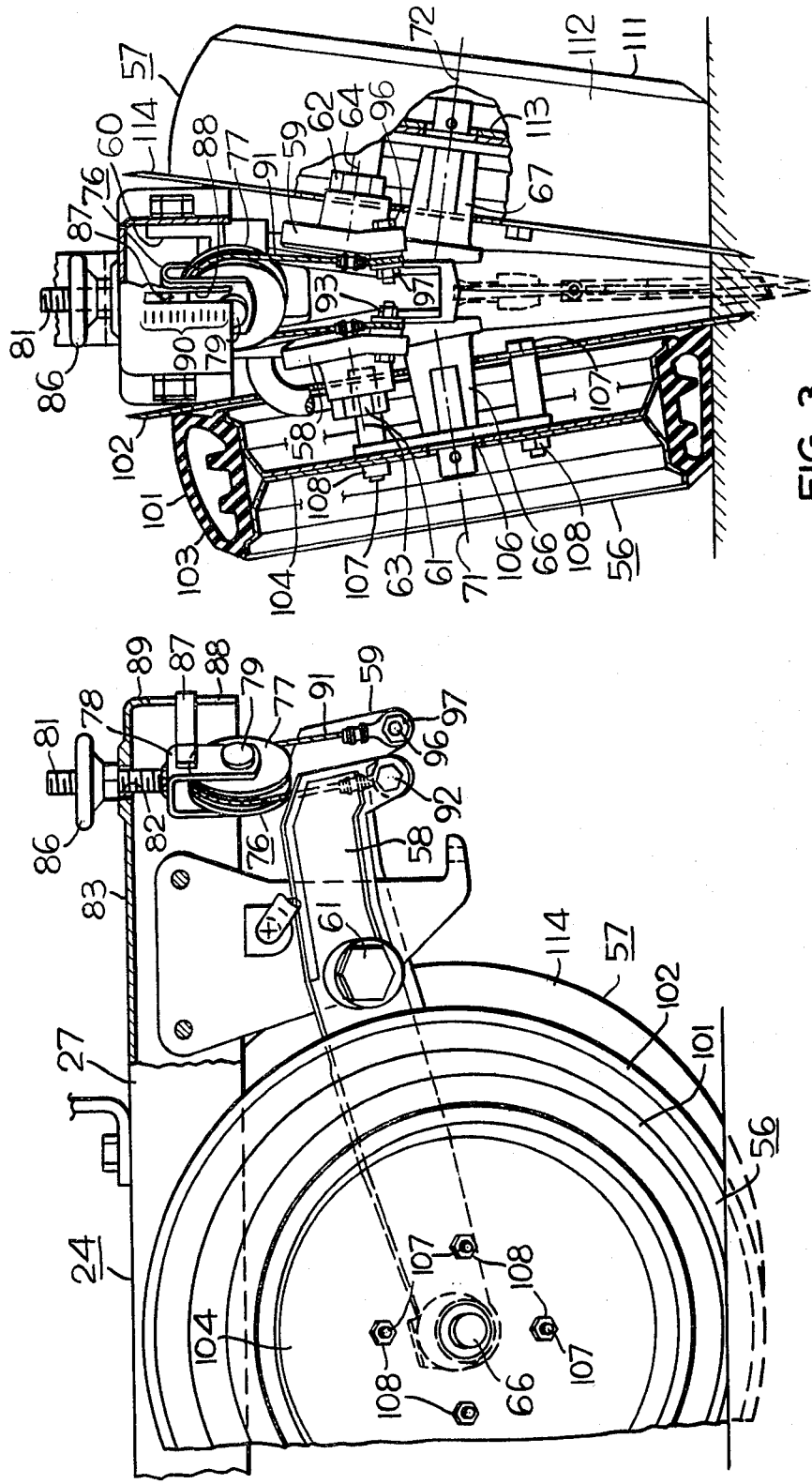
FIG. 2 is an enlarged partial side view of the planter unit with parts broken away to show the equalizer mechanism.
FIG. 3 is a rear view of the structure shown in FIG. 2 with parts broken away for illustration purposes.

Referring also to FIGS. 2 and 3, a pair of longitudinally extending, side-by-side walking beams 58, 59 are mounted on a bracket 60 on subframe 27 by a pair of pivot pins 61, 62 for oscillation about generally transverse but slightly canted axes 63, 64 which are offset from one another in the longitudinal direction, that is, the direction of movement of the planter during a normal planting operation. Combined gauge wheel and slicing disc assemblies 56, 57 are rotatably mounted on the corresponding forward ends of the beams 58, 59 by means in the form of axle and bearing assemblies 66, 67 permitting the wheels to rotate about generally transverse, but canted, axes 71, 72 which are in staggered relation to one another in longitudinal direction and are parallel, respectively, with the axes 63, 64.

An equalizer mechanism 76 is provided between the corresponding rear ends of the walking beams 58, 59 to minimize the seed depth variations caused by ground irregularities. The equalizer mechanism 76 includes a grooved pulley 77 rotatably mounted by a pin 79 on a vertically adjustable support in the form of a clevis 78. The clevis 78 includes an upwardly extending, exteriorly threades shank 81 which extends through a vertical opening 82 in the top wall 83 of the subframe 27 of the planter unit frame 24. A hand wheel 86 is provided with an internally threaded opening which threadedly engages the threaded shank 81. A horizontal stabilizer bar 87 is secured as by welding to one of the two downwardly extending legs of the clevis 87 and has a free end extending through a vertical slot 88 in the rear wall 89 of the planter subframe 27 rearwardly of the pulley 77. The stabilizer bar 87 and the opposed surfaces defining the slot 88 constitute abutments serving to prevent the clevis from turning relative to the subframe 27 about the axis of the shank 81. The vertical position of the stabilizer bar 87 in the slot 88 correlates with the depth of planting. By aligning the top of the stabilizer bar 87 with gauge marks 90 on the exterior of the rear wall 89, predetermined planting depths can be achieved. Thus, the vertically spaced marks 90 and bar 87 constitute a planting depth gauge. A flexible tension member in the form of a cable 91 has one end secured to the rear free end of walking beam 58 by a bolt 92 and nut 93 and has its other end secured to the rear free end of the walking beam 59 by a bolt 96 and nut 97. An intermediate portion of the cable 91 is reeved over the grooved pulley 77.

Referring particularly to FIGS. 2 and 3, the combined gauge wheel and slicing disc assembly 56 includes a gauge wheel 101 and a slicing disc 102. The gauge wheel 101 includes a zero pressure tire 103 mounted on a wheel rim 104. The wheel rim 104 and the slicing disc 102 are secured to a wheel hub 106 by four bolts 107 and four nuts 108. Likewise, the combined gauge wheel and slicing disc assembly 57, which is a reverse image of assembly 56, includes a gauge wheel 111 having a zero pressure tire 112 on rim 113 and a slicing disc 114. The provision of combined gauge wheel and slicing disc assemblies in planter units illustrated and described herein is a subject matter of a copending patent application of Alexander T. Gafford and myself filed Sept. 2, 1982, Ser. No. 413,979.

The cable reeved over the pulley 77 permits the rear ends of the walking beams 58, 59 to move vertically relative to one another. Therefore, the gauge wheels are free to move vertically relative to one another as uneven ground is encountered in a planting operation. Having an equalizer mechanism between the gauge wheels cuts in half the vertical planting depth change as compared to the vertical displacement of a gauge wheel as it rolls over an increased height irregularity in the field. By making the pulley vertically adjustable between predetermined raised and lowered positions, the depth of penetration of the seed trench forming discs 43, 44 can be selectively adjusted thus permitting selective adjustment of the seed planting depth through turning of the hand wheel 86.

The embodiments of the invention in which an exclusive property or privilege is claimed are defined as follows:

1. In an agricultural implement including a frame adapted for connection in towed relation to a draft appliance and a soil penetrating tool secured to said frame, the combination comprising:

first and second laterally spaced gauge wheels operable to support said frame and control the working depth of said soil penetrating tool and means mounting said wheels in supporting relation to said frame including a pair of longitudinally extending walking beams in side-by-side relation to one another for supporting said wheels, respectively, means rotatably supporting said wheels on corresponding front ends of said walking beams, means mounting intermediate portions of said beams on said frame for independent vertical pivotal movement, and an equalizer mechanism interconnecting the corresponding rear ends of said beams including a pulley at the rear of said frame, a support rotatably mounting said pulley and adjustably secured to said frame for vertical adjustment of said pulley between predetermined raised and lowered positions, and a flexible tension member having opposite ends connected to said corresponding rear ends of said beams and an intermediate portion reeved about said pulley.

2. The implement of claim 1 wherein said rear ends of said beams are staggered relative to one another in the direction of movement of said implement when supported by said wheels.

3. The implement of claims 1 or 2 wherein said frame includes a top wall presenting a vertical opening above said pulley and a rear wall presenting a vertically extending slot rearwardly of said pulley; wherein said support includes a clevis having a pair of downwardly extending legs rotatably supporting said pulley, a first threaded member extending upwardly from said legs through said opening, a second threaded member threadedly engaging said first threaded member and in vertical thrust transmitting relation to said top wall and a horizontal bar secured to said clevis and extending rearward therefrom and through said vertically extending slot and further comprising vertically spaced marks on said rear wall adjacent said slot, the position of said bar in relation to said marks serving to indicate the depth of planting and said bar serving to prevent rotation of said first threaded member about its axis.

* * * * *